United States Patent [19]
Wier

[11] Patent Number: 6,016,589
[45] Date of Patent: *Jan. 25, 2000

[54] BUCKLE FOR A SAFETY BELT

[75] Inventor: Franz Wier, Göggingen, Germany

[73] Assignee: TRW Occupant Restraint Systems GmbH, Alfdorf, Germany

[*] Notice: This patent issued on a continued prosecution application filed under 37 CFR 1.53(d), and is subject to the twenty year patent term provisions of 35 U.S.C. 154(a)(2).

[21] Appl. No.: 08/852,203

[22] Filed: May 6, 1997

[30] Foreign Application Priority Data

May 6, 1996 [DE] Germany .................. 296 08 192 U

[51] Int. Cl.[7] .............................. A44B 11/25; B60R 22/46
[52] U.S. Cl. ............................. 24/687; 24/641; 24/122.3
[58] Field of Search .................... 24/687, 641, 640, 24/122.3, 122.6, 130, 134 N, 135 R, 682.1, 703.1, 265 R; 297/480, 482

[56] References Cited

U.S. PATENT DOCUMENTS

| | | |
|---|---|---|
| 3,680,913 | 8/1972 | Seybold . |
| 3,722,909 | 3/1973 | Esner . |
| 3,895,196 | 7/1975 | Lewis . |
| 4,004,115 | 1/1977 | Esner . |
| 4,065,836 | 1/1978 | Stephenson ........................ 24/641 |
| 4,068,354 | 1/1978 | Loomba et al. ..................... 24/641 |
| 4,069,557 | 1/1978 | Loomba ............................. 24/641 |
| 4,071,929 | 2/1978 | Loomba ............................. 24/687 |
| 4,177,541 | 12/1979 | Seakan ......................... 24/122.3 X |
| 4,237,586 | 12/1980 | Morinaga .......................... 24/641 |
| 4,266,325 | 5/1981 | Ennerdal et al. . |
| 4,402,114 | 9/1983 | Takagi . |
| 4,498,222 | 2/1985 | Ono et al. ....................... 24/687 X |
| 4,520,538 | 6/1985 | Sano et al. ..................... 24/687 X |
| 4,555,832 | 12/1985 | Sano et al. ..................... 24/687 X |
| 4,915,451 | 4/1990 | Forget et al. ..................... 297/468 |
| 5,377,393 | 1/1995 | Ellis .............................. 24/641 X |
| 5,671,949 | 9/1997 | Baue et al. .................... 297/480 X |

FOREIGN PATENT DOCUMENTS

| | | |
|---|---|---|
| 566209 U | 6/1979 | Japan . |
| 55-3580 U | 9/1979 | Japan . |
| 61-63953 U | 6/1986 | Japan . |

Primary Examiner—Anthony Knight
Assistant Examiner—Robert J. Sandy
Attorney, Agent, or Firm—Tarolli, Sundheim, Covell, Tummino & Szabo L.L.P.

[57] ABSTRACT

A buckle for a safety belt has a housing with a recess, a cable to anchor the buckle to a vehicle or to a vehicle seat, and a cable fixing device. The cable has an end nearest to the buckle and the cable fixing device has a retaining section by which the cable fixing device is connected with the end of the cable. The cable fixing device is attached to the buckle. The retaining section extends at least partly into the recess.

11 Claims, 4 Drawing Sheets

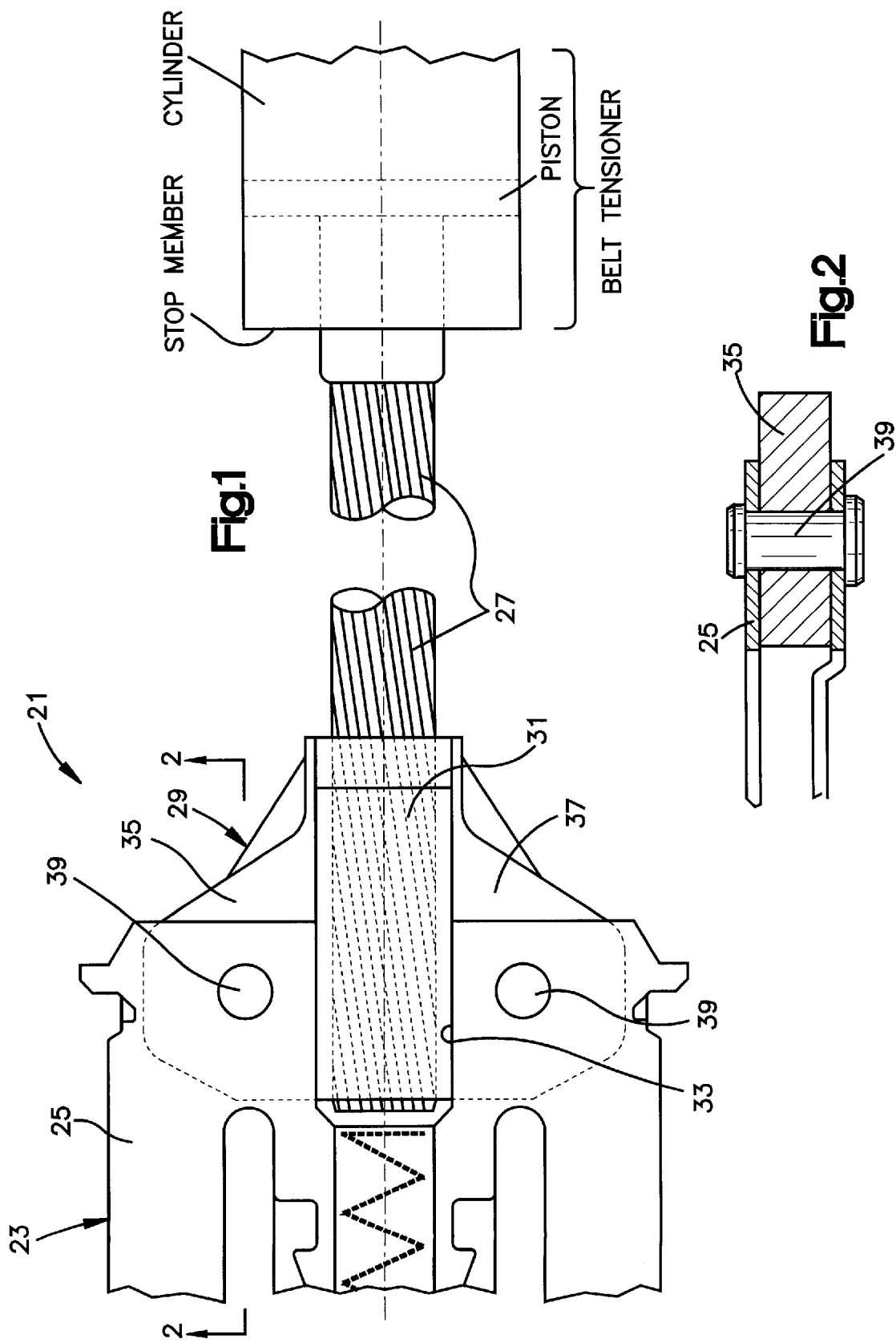

BUCKLE FOR A SAFETY BELT

TECHNICAL FIELD

The invention relates to a buckle for a safety belt.

BACKGROUND OF THE INVENTION

With buckles normally used so far, the end of the cable fixing device facing away from the buckle is pressed together with the cable to form a retaining section. From the retaining section, a plate-like extension of the cable fixing device extends into the interior of the housing of the buckle, where the cable fixing device is secured to the housing by means of bolts. Such cable fixing devices, however, extend axially very far forwards in relation to the housing of the buckle, so that the known buckles, including cable fixing devices, are very long. This is particularly disadvantageous when using belt tensioners, since excessively long buckles, including cable fixing devices, restrict the possible maximum tensioning distance due to the small amount of available space.

BRIEF SUMMARY OF THE INVENTION

The invention provides a buckle which has an attached cable fixing device and which has an extremely short overall axial length, thus facilitating housing in a vehicle, particularly when a belt tensioner is used. In addition, the tensioning distance of a belt tensioner can be increased through the overall axial length gained.

The buckle according to the invention has a housing with a recess, a cable to anchor the buckle to a vehicle or to a vehicle seat, and a cable fixing device. The cable has an end nearest to the buckle and the cable fixing device has a retaining section by which the cable fixing device is connected with the end of the cable. The cable fixing device is attached to the buckle and the retaining section extends at least partly into the recess. The spatial separation customary so far, achieved by arranging the retaining section outside the housing and a section for locking the cable fixing device within the housing, is no longer provided for in the buckle in accordance with the invention.

The cable fixing device is preferably connected to the cable by pressing it together with the retaining section.

In accordance with the preferred embodiment, means for locking the buckle are located on the cable fixing device along the direction of the cable to th e side of the retaining section, for example laterally in the direction of the width or height of the buckle. Conventional bolt fixing devices can be used. It is also possible to design the cable fixing device and the buckle in such a way that the cable fixing device can be secured in the buckle or can snap into the buckle.

The tensile force that can be transmitted from the cable fixing device to the cable can be increased by the end of the cable nearest to the buckle side projecting in relation to the retaining section and being unravelled in the projecting area. The unravelled end of the cable causes the cable cross-section to be increased in relation to the cable cross-section in the pressed area, so that the end of the cable is supported by the front of the cable fixing device.

When the buckle is used with a belt tensioner, the cable fixing device preferably has deformation areas which strike a limiting counterpart at the end of the tensioning path and are plastically deformed, thus allowing force peaks occurring when the cable fixing device strikes the counterpart to be reduced.

BRIEF DESCRIPTION OF THE DRAWINGS

FIG. 1 shows a top view of the buckle with cable fixing device in accordance with the invention, FIG. 2 shows a sectional view along the line II—II in FIG. 1, showing the means of catching the cable fixing device in the buckle.

DETAILED DESCRIPTION OF PREFERRED EMBODIMENTS

Figure 3:
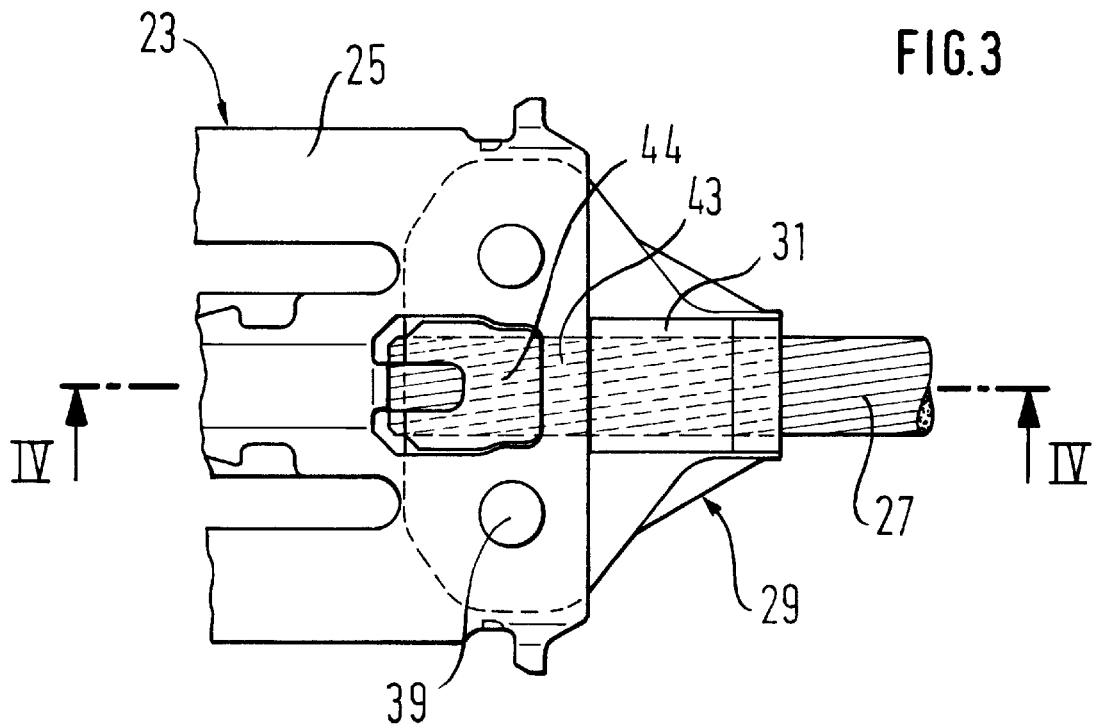
FIG. 3 shows a top view of the buckle with cable fixing device in accordance with the invention, in accordance with a second embodiment in which the cable fixing device snaps into the buckle or is secured in the buckle.

FIG. 1 shows a unit 21 with a very short design, consisting of a buckle 23 with a housing 25 and a cable 27, which is connected to the buckle 23 by means of a cable fixing device 29. The cable fixing device 29 is inseparably secured to the cable 27 by being pressed together with it in the region of the retaining section 31. The housing 25 has at its rear a slot-shaped recess 33 into which the retaining section 31 extends. Flattened extensions 35 and 37 protrude laterally from the retaining section 31 into the interior of the housing 25, to which they are attached with bolts 39, as shown in FIG. 2. The extensions 35 and 37 have two through passages for securing the cable fixing device. Through the lateral location of the through passages and the bolts 39 which serve as a means to lock the cable fixing device 29 to the buckle 23, the overall axial length of the buckle 23 together with the cable fixing device 29 can be further reduced.

Figure 4:
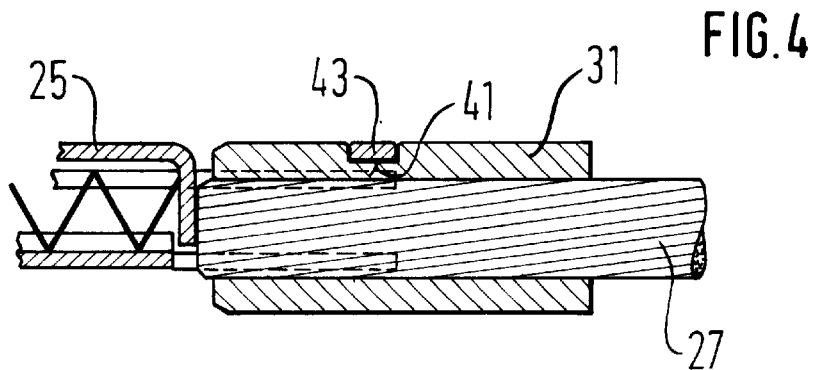
FIG. 4 shows a sectional view along the line IV—IV in FIG. 3, showing the connection between the cable fixing device and the housing.

Instead of or in addition to attachment by means of bolts 39, a connection between the cable fixing device 29 and the buckle 23 can be achieved in accordance with the embodiment shown in FIG. 3 by the provision of a snap-in mechanism. For this purpose, the cable fixing device 29 has on its surface a groove 41 running at right angles to the longitudinal direction of the cable in the region of the retaining section 31 (cf. FIG. 4) and which a bridge-type snap-in part 43 of the housing 25 engages into, thus locking the cable fixing device 29. The bolts 39 are also intended as additional means of locking. Instead of the snap-in connector, a hook-type connection between the cable fixing device 29 and the buckle 23 can be provided for by the region of the cable fixing device 29 designated as 44 being designed as a hook into which the snap-in part 43 engages.

Figure 5:
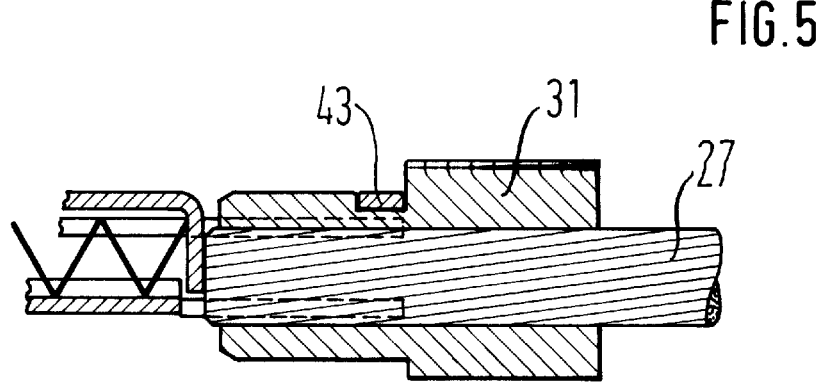
FIG. 5 shows a sectional view corresponding to FIG. 4, showing a slightly modified cable fixing device.
Figure 6:
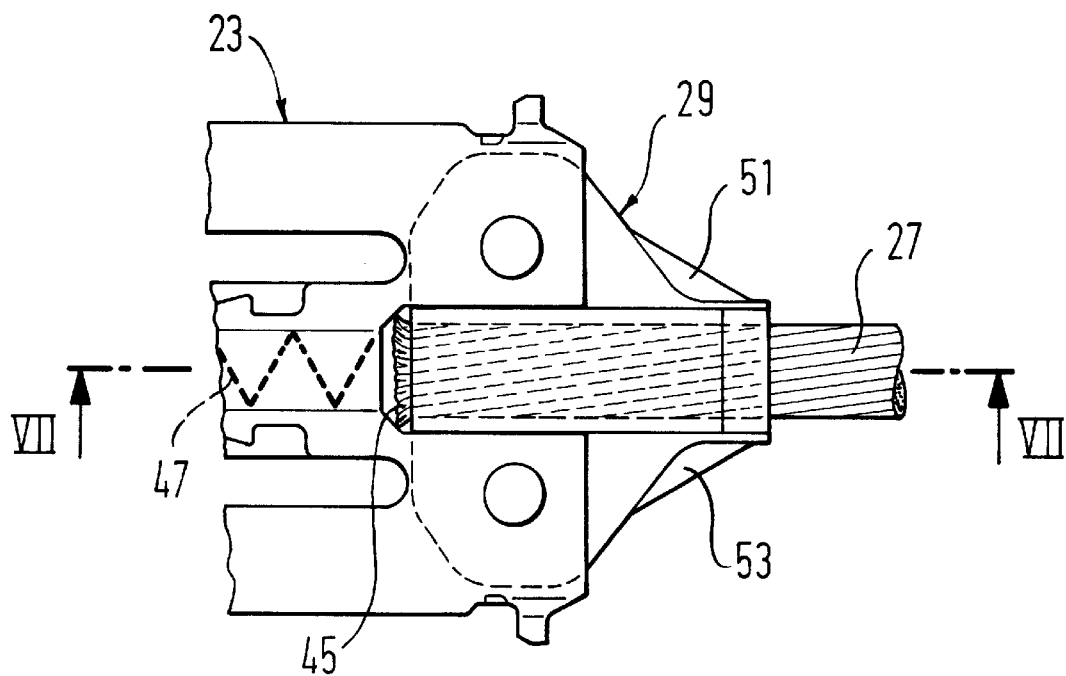
FIG. 6 shows a top view of a third embodiment of the buckle with cable fixing device in accordance with the invention.

The embodiment of the cable fixing device 29 shown in FIG. 5 differs from the embodiment shown in FIGS. 5 and 6 in that the cable fixing device 29 has a greater wall thickness in the region of the retaining section 31 located outside the housing 25 than inside the housing 25, which allows the stability of the cable fixing device 29 and the maximum tensile force that can be transmitted to the cable 27 to be increased.

The maximum tensile force that can be transmitted from the cable fixing device 29 to the cable 27 can also be increased by the end of the cable 27 at the buckle side projecting in relation to the retaining section 31 and the cable structure being unravelled in this area. The unravelled section of the cable is designated as 45 in FIG. 7. The unravelled end of the cable causes the cable cross-section to be increased, so that the cable 27 is supported by the front of the retaining section 31.

To save further space, in particular axial space, an ejector spring 47 is located directly at the front of the end of the cable 27 nearest to the buckle side. The ejector spring 47 serves to eject a latch (not shown), which can be engaged in the buckle 23, automatically from the buckle 23 at the press of a button.

Figure 7:
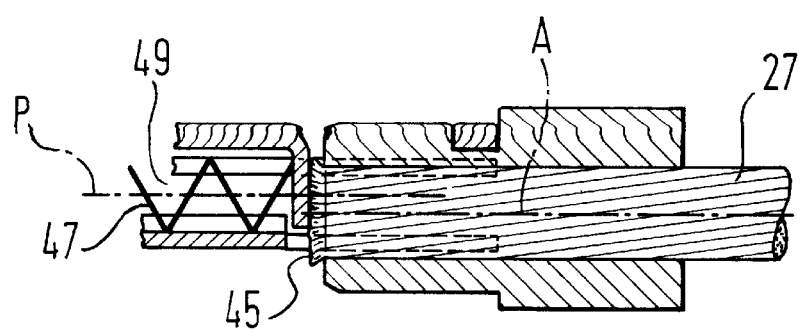
FIG. 7 shows a sectional view along the line VII—VII in FIG. 6.

Furthermore, the cable fixing device 29 need not be symmetrical in relation to the cable centre axis A, as shown in the drawings, but it can also be asymmetrical, so that its design can be more specifically adapted to the structural space available but not already used. This can also be achieved by the cable centre axis A, as shown in FIG. 7, being offset in relation to the centre axis P of a latch holding space 49.

At the end of the cable fixing device 29 facing away from the buckle 23, flat deformation areas 51 and 53 are formed on the extensions 35 and 37. When a belt tensioner is used, the deformation areas 51, 53 strike a limiting stop at the end of the tensioning path in such a way that they are plastically deformed. This reduces the maximum force that can occur when the cable fixing device 29 strikes the limiting stop.

Figure 8:
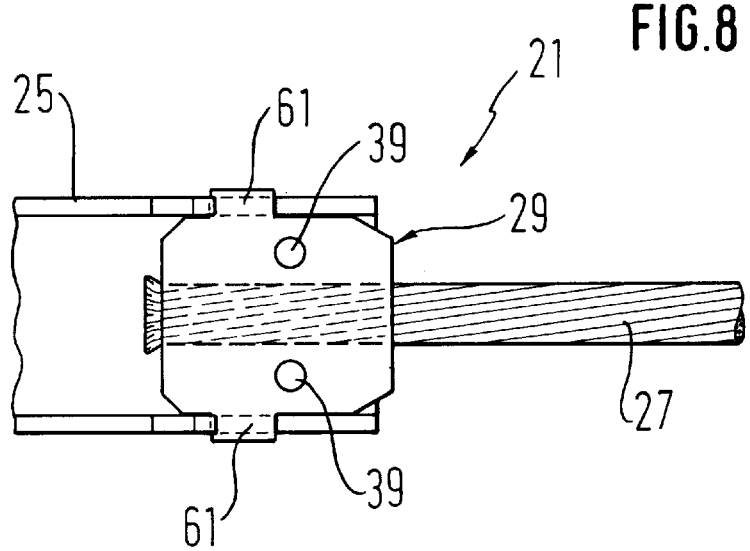
FIG. 8 shows a top view of a forth embodiment of the buckle according to the present invention together with the cable fixing device.
Figure 9:
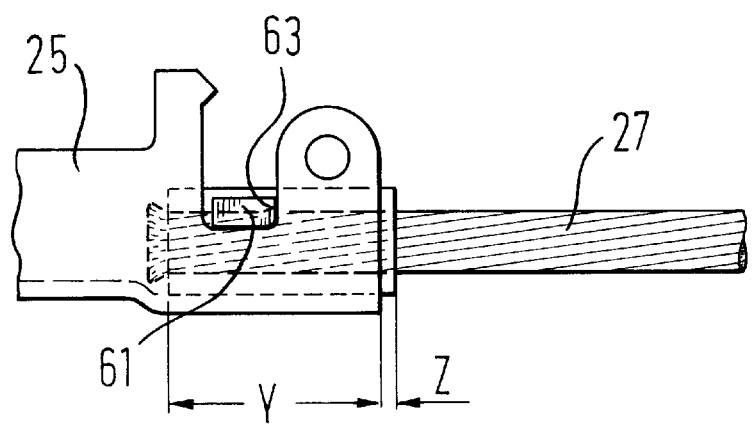
FIG. 9 shows a side view of the buckle depicted in FIG. 8.

The buckle according to FIGS. 8 and 9 has a U-shaped housing 25 on which a cover, not shown, is fixed. The U-shaped housing 25 has legs with recesses, as is to be seen in FIG. 9 in more detail, in which two opposite studs 61 extend which protrude from the side of the cable fixing device. In this embodiment, the cable fixing device is pressed into the housing. In case of a restraint, a bearing surface 63, limitting the recess on one side, transfers the force exerted on the buckle 21 to the cable fixing device 29. Additionally it is possible to caulk the housing 25 and the cable fixing device 29. If both parts are caulked together and/or if the cable fixing device is pressed into the housing, the bolt 29 may be superfluous. The length Y of the pressed portion is, in general, relatively short. The cable fixing device projects out of the housing by a short length Z.

Figure 10:
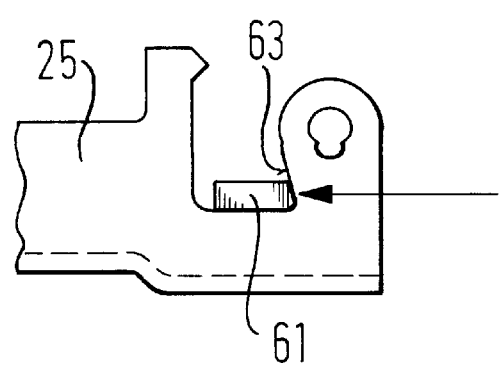
FIG. 10 shows a side view of a fifth embodiment of the buckle according to the present invention, said buckle being partly amended with respect to the buckle shown in FIGS. 8 and 9.

With the embodiment shown in FIG. 10, the bearing surface is inclined upwardly and projects partly above the studs 61. A self locking effect materializes upon exerting a traction load on the buckle, since the studs 61 intend to move deeper into the recess by means of the inclined bearing surface.

The unit consisting of a buckle and a cable fixing device shown in FIGS. 1 to 10 is very compact in design and is characterised by a short overall axial length. The length saved in comparison to the conventional buckles with cable fixing devices used so far can be used to increase the maximum tensioning distance of a belt tensioner.

What is claimed is:

1. Buckle for a safety belt, having
   a housing with a recess,
   a cable to anchor said buckle to a vehicle or to a vehicle seat,
   said cable having an end nearest to said buckle, and
   a cable fixing device comprising a single part having a retaining section and flattened extensions integral with said retaining section and protruding only laterally from said retaining section on two opposite sides of said retaining section,
   said cable fixing device being connected with said end of said cable by pressing said cable together with said retaining section,
   said retaining section and said end of said cable nearest to said buckle extending at least partly into said recess, said flattened extensions extending only laterally relative to said retaining section and extending into said housing,
   said retaining section being attached to said buckle by locking means in the form of bolts, and
   said bolts being located on said cable fixing device seen in the longitudinal direction of said cable on two opposite sides of said retaining section and extending through said flattened extensions.

2. Buckle in accordance with claim 1, wherein said end of said cable nearest to said buckle has an end area which projects in relation to said retaining section and is unraveled in said end area.

3. Buckle in accordance with claim 1, wherein said cable fixing device is asymmetrical in relation to said centre axis of said cable.

4. Buckle in accordance with claim 1, wherein within said housing a latch holding space with a center axis is provided, said center axis of said cable being laterally offset in relation to the center axis of said space.

5. Buckle for a safety belt, having
   a housing with a recess,
   a cable to anchor said buckle to a vehicle or to a vehicle seat,
   said cable having an end nearest to said buckle, and
   a cable fixing device having a retaining section,
   said cable fixing device being connected with said end of said cable by pressing said cable together with said retaining section,
   said retaining section and said end of said cable nearest to said buckle extending at least partly into said housing, said cable fixing device having flattened extensions protruding only laterally from said retaining section on two opposite sides with respect to said cable and extending into said housing,
   said cable fixing device being attached to said buckle by locking means in the form of bolts,
   said bolts being located on said cable fixing device seen in the longitudinal direction of said cable on two opposite sides of said retaining section and extending through said flattened extensions, and
   said cable and said cable fixing device each having a front at their ends arranged within said housing and wherein a latch ejector spring is supported at one of said front of said end of said cable and said front of said cable fixing device.

6. Buckle for a safety belt, having
   a housing with a recess,
   a cable to anchor said buckle to a vehicle or to a vehicle seat,
   said cable having an end nearest to said buckle, and
   a cable fixing device having a retaining section,
   said cable fixing device being connected with said end of said cable by pressing said cable together with said retaining section, said retaining section and said end of said cable nearest to said buckle extending at least partly into said housing, said cable fixing device having flattened extensions protruding only laterally from said retaining section on two opposite sides with respect to said cable and extending into said housing, said cable fixing device being attached to said buckle by locking means in the form of bolts, said bolts being located on said cable fixing device seen in the longitudinal direction of said cable on two opposite sides of said retaining section and extending through said flattened extensions, and said cable fixing device has as at least one stud projecting from the side thereof, said housing of said buckle having a recess into which said stud extends.

7. Buckle in accordance with claim 6, wherein said housing has a portion on which a bearing surface is provided, said portion partly surrounding said stud.

8. Buckle for a safety belt, having a housing with a recess, a cable to anchor said buckle to a vehicle or to a vehicle seat, said cable having an end nearest to said buckle, and a cable fixing device having a retaining section, said cable fixing device being connected with said end of said cable by pressing said cable together with said retaining section, said retaining section and said end of said cable nearest to said buckle extending at least partly into said housing, said cable having a center axis, said cable fixing device being able to snap into said buckle by being inserted into said housing via said recess in the direction of said center axis.

9. Buckle in accordance with claim 8, wherein said cable fixing device has on its surface a groove running at right angles to said centre axis and said housing has a snap-in part which extends into said groove.

10. Buckle in accordance with claim 8, wherein said retaining section has a wall thickness which is greater outside said housing than inside said housing.

11. Buckle for a safety belt connected to a belt tensioner which displaces said buckle for a tensioning path upon actuation, having a housing with a recess, a cable to anchor said buckle to a vehicle or to a vehicle seat, said cable having an end nearest to said buckle, a cable fixing device having a retaining section and deformation areas, and a counterpart stop for said buckle, said cable fixing device being connected with said end of said cable by pressing said cable together with said retaining section, said retaining section and said end of said cable nearest to said buckle extending at least partly into said housing, and said deformation areas striking against said counterpart stop at the end of said tensioning path and being plastically deformed thereby.

* * * * *